United States Patent [19]

Sullivan et al.

[11] Patent Number: 5,086,289
[45] Date of Patent: Feb. 4, 1992

[54] U-TURN SIGNAL DEVICE

[76] Inventors: Maureen A. Sullivan, 26732 Crown Valley Pkwy., No. 111, Mission Viejo, Calif. 92691; Elizabeth A. Himelson, 24953 Paseo de Valencia, No. 8C, Laguna Hills, Calif. 92653

[21] Appl. No.: 495,498
[22] Filed: Mar. 19, 1990
[51] Int. Cl.5 .............................................. B60Q 1/34
[52] U.S. Cl. ................................. 340/475; 200/61.27; 200/61.54; 340/465
[58] Field of Search ...................... 340/475–478, 340/468, 465, 464; 307/10.8; 200/61.27, 61.54

[56] References Cited

U.S. PATENT DOCUMENTS

| | | | |
|---|---|---|---|
| 2,112,331 | 3/1938 | Condon | 200/61.27 |
| 2,796,483 | 6/1957 | Wolf | 200/61.54 |
| 2,891,118 | 6/1959 | Hollins | 200/61.27 |
| 3,510,839 | 5/1970 | Elliott et al. | 340/471 |
| 3,716,682 | 2/1973 | Wizemann | 340/475 |
| 4,387,361 | 6/1983 | Reed | 340/475 |
| 4,431,984 | 2/1984 | Bileck | 340/468 |
| 4,640,997 | 2/1987 | Lane, Jr. | 200/61.27 |
| 4,677,932 | 7/1987 | Ewing | 200/61.27 |
| 4,831,752 | 5/1989 | Clevenger | 200/61.54 |
| 4,868,541 | 9/1989 | Sullivan et al. | 340/465 |

Primary Examiner—Joseph A. Orsino, Jr.
Assistant Examiner—Brent A. Swarthout
Attorney, Agent, or Firm—I. Michael Bak-Boychuk

[57] ABSTRACT

A U-turn signaling attachment useful with the turn signal stalk of a motor vehicle includes a frame conformed for engagement to the stalk and a lever pivoted on one end of the frame. A cam edge is fixed to the lever to oppose one end of a push rod which, at its other end, oppposes a double lobed surface attached to the steering column. The cam edge, at its center position, is chamfered transversely to clear the push rod during fore and aft motion.

5 Claims, 3 Drawing Sheets

FIG—.3

U-TURN SIGNAL DEVICE

BACKGROUND OF THE INVENTION

1. Field of the Invention

The present invention relates to automotive signaling devices, and more particularly to a U-turn signaling device conformed for common installation on a motor vehicle turn signaling stalk.

2. Description of the Prior Art

In our prior U.S. Pat. No. 4,868,541 we have devised an after-market U-turn signaling arrangement controlled by ultrasonic signal sources mounted on the vehicle steering wheel. Since that time we have discovered an alternative structure rendered operative by the manipulation of the turn signal stalk.

To achieve an effective U-turn the operator of a vehicle, of necessity, must reduce the vehicle speed to a rate substantially lower than that associated with other turns. Simply, an effective U-turn entails a much smaller turning radius and thus the vehicle speed must, of necessity, be lowered. The following traffic has no visual suggestion of this difference in vehicle maneuver and, consequently, cannot anticipate this lower vehicle speed.

The statistical incidence of U-turn in the normal course of events is extremely rare. As result, the normal anticipation is that of a left hand turn and the somewhat higher vehicle speed of this maneuver. This lack of a warning signal has led to many collisions with a consequent suggestion of various signal devices in the art. Exemplary teachings of various rear signaling arrangements appear in U.S. Pat. Nos. 3,656,104; 3,678,457; 4,361,828; and 3,593,277. Each of these, while suitable for the purposes intended, do not attend to the manipulative convenience required for use.

A conveniently manipulated signaling extension is therefore sought and it is one such extension that is disclosed herein.

SUMMARY OF THE INVENTION

Accordingly, it is the general purpose and object of the present invention to provide a signal attachment for the turn signal stalk of a motor vehicle which is conveniently mounted and convenient in use.

Other objects of the invention are to provide a switching mechanism on the end of a turn signal stalk operative in the displaced position of the stalk.

Yet further objects of the invention are to provide a switching mechanism for the turn signal stalk of a vehicle which is released with the centering motion of the stalk.

Briefly, these and other objects are accomplished within the present invention by providing a switch mechanism deployed on the turn signal stalk. A spring-loaded detent bar is slideably attached along the stalk with the inward end thereof opposing a cam surface raised at both extremes of the stalk motion. Thus, when the turn signal stalk is displaced to either signaling position the detent bar is displaced outwardly towards a set of detents fixed to the stalk mounted switch. Accordingly, at the extreme positions of the stalk motion a detent engagement is provided for the switch. This switch is then connected into the corresponding turn signal circuit to carry the turn signal power into parallel signal housings indicating a U-turn.

Alternatively, the turn signal stalk may be provided with further detents in the course of manufacture and by extreme manipulation of the stalk a U-turn signal is effected. This signal arrangement may include a front signal light by which the oncoming traffic is advised of the intended U-turn.

DESCRIPTION OF THE PREFERRED EMBODIMENT

Figure 1:
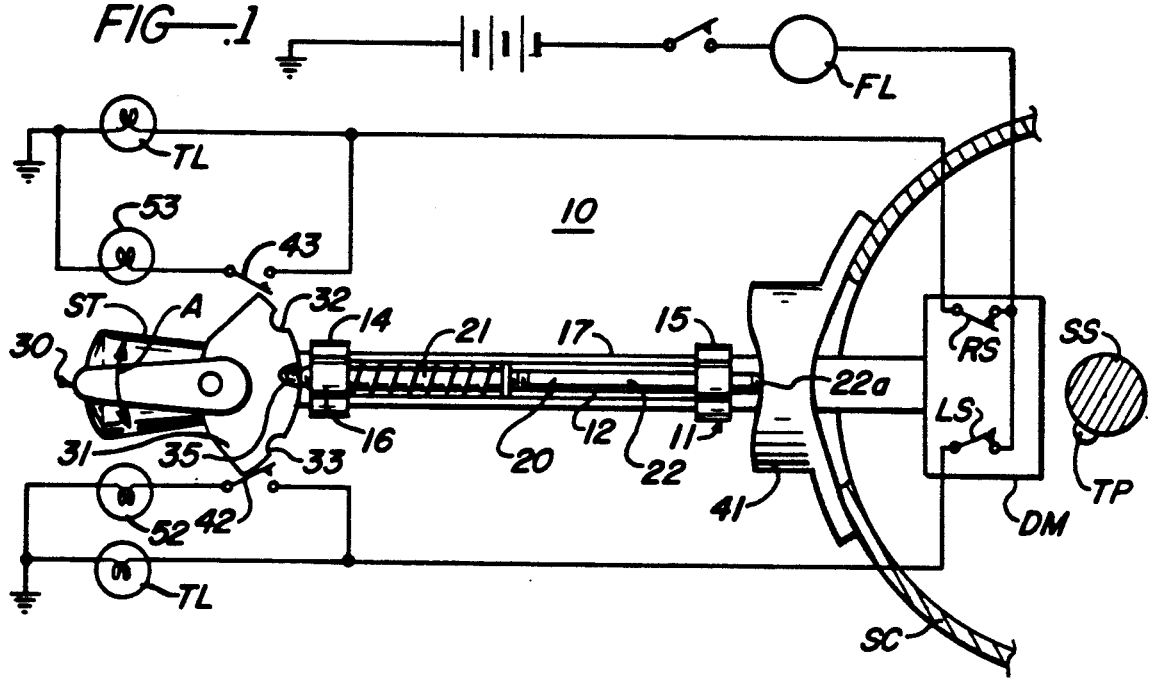
FIG. 1 is a perspective illustration of the inventive switching mechanism conformed for mounting on a conventional turn signal stalk.
Figure 2:
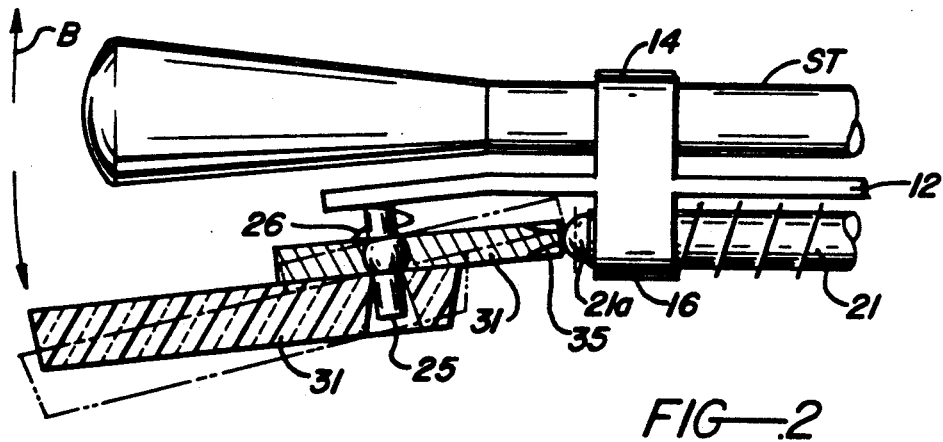
FIG. 2 is a detail illustration, in partial section, of the switching geometry of the inventive switch mechanism shown in FIG. 1.

As shown in FIGS. 1 and 2 a conventional turn signal stalk ST is typically provided with a detent mechanism DM within the steering column SC of a motor vehicle. In various known manners the stalk ST is released from either of its signaling positions by a tripping projection TP on the steering shaft SS.

Thus, the conventional turn signal mechanism provides a switch stalk which is manually upset to either limit and which is released from this upset position by subsequent steering wheel movement. At either limit the turn signal stalk provides electrical continuity from a flasher to either the left or right turn signal circuits. These then illuminate turn signal lights both at the front and the rear of the vehicle. More precisely, the detent mechanism DM includes a right and left position switch RS and LS to which the flasher FL is connected. The closure of either switch then completes the circuit to the selected turn signal lamps TL of the vehicle.

While the foregoing arrangement is implemented in various choices of detail, the general arrangement is widely practiced and the turn signal stalk is now an item of virtually universal acceptance. The inventive U-turn signaling mechanism generally designed by the numeral 10, is conformed for deployment on the stalk ST by way of an attachment fixture 11 characterized by an elongate spine 12. Spine 12 is provided with two attachment clips 14 and 15 which attach to the stalk and a set of guides 16 and 17 for locating a pushrod 20. One end of the spine 12 then extends towards the free end of the stalk to provide a pivot 25 for a switch lever 30.

Switch lever 30 is provided with a detent cam 31 which, on its cam edge, includes two detent recesses 32 and 33, spaced in equal arc increments from the switch center position. The cam edge 31, moreover, is transversely chamfered at the center by relief chamfers 35.

Push rod 20 is formed by threading an inner push rod segment 21 into the interior of an outer push rod segment 22. Once thus threaded a locking nut (not shown) locks the segments together while at the same time compressing a helical spring 24 against the guide 16. Each of the segments 21 and 22 includes a ball roller 21a and 22a at its free end with the ball roller 21a presented against the cam edge 31. Pivot 25, in turn, is shaped as a ball pivot compressing a centering spring 26 between the spine 12 and the lever 30.

In this form the fore and aft motion of the stalk (as sometimes implemented for headlight dimming), manually affected by pressing lever 30, will also clear the chamfered edge 31 from the ball roller 21a. Segment 22 then passes into the chamfers 35 during this fore-and-aft movement.

In the arcuate movement plane designated by the arrow A lever 30 advances cam 31 along the ball roller 21a until engagement is made with either of the recesses 32 and 33. Concurrently the stalk is displaced along the arc B advancing the other ball roller 22a along a double lobed cam surface 41 fixed to the steering column SC. The lobe dimensions of the cam surface 41 are selected to engage ball roller 22a in a corresponding recess with the engagement released once the stalk is returned to the center position At either engagement of the lever 30 a left and right U-turn switch 42 and 43 is closed to complete a circuit from the corresponding switches LS and RS. This circuit then illuminates the left and right U-turn signaling lights 52 and 53 both at the front and the rear of the vehicle.

Figure 3:
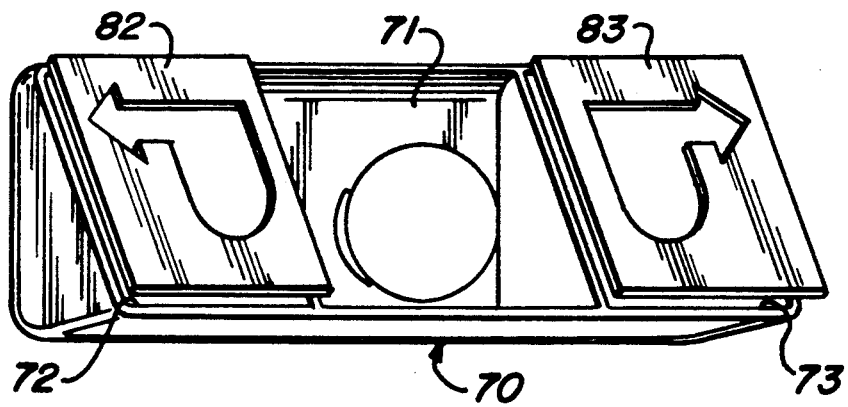
FIG. 3 is a perspective illustration of a signal assembly useful with the invention herein.

As illustrated in FIG. 3 the rear display of the U-turn signals may be combined with the center brake light now installed in most new vehicles. Thus a center brake light housing 70 may include a center cavity 71 for the brake light between a left and right cavity 72 and 73 in which the signaling lights 52 and 53 are respectively mounted. Cavities 72 and 73 may be covered with corresponding message templates 82 and 83 indicating the planned direction of the U-turn.

Figure 4:
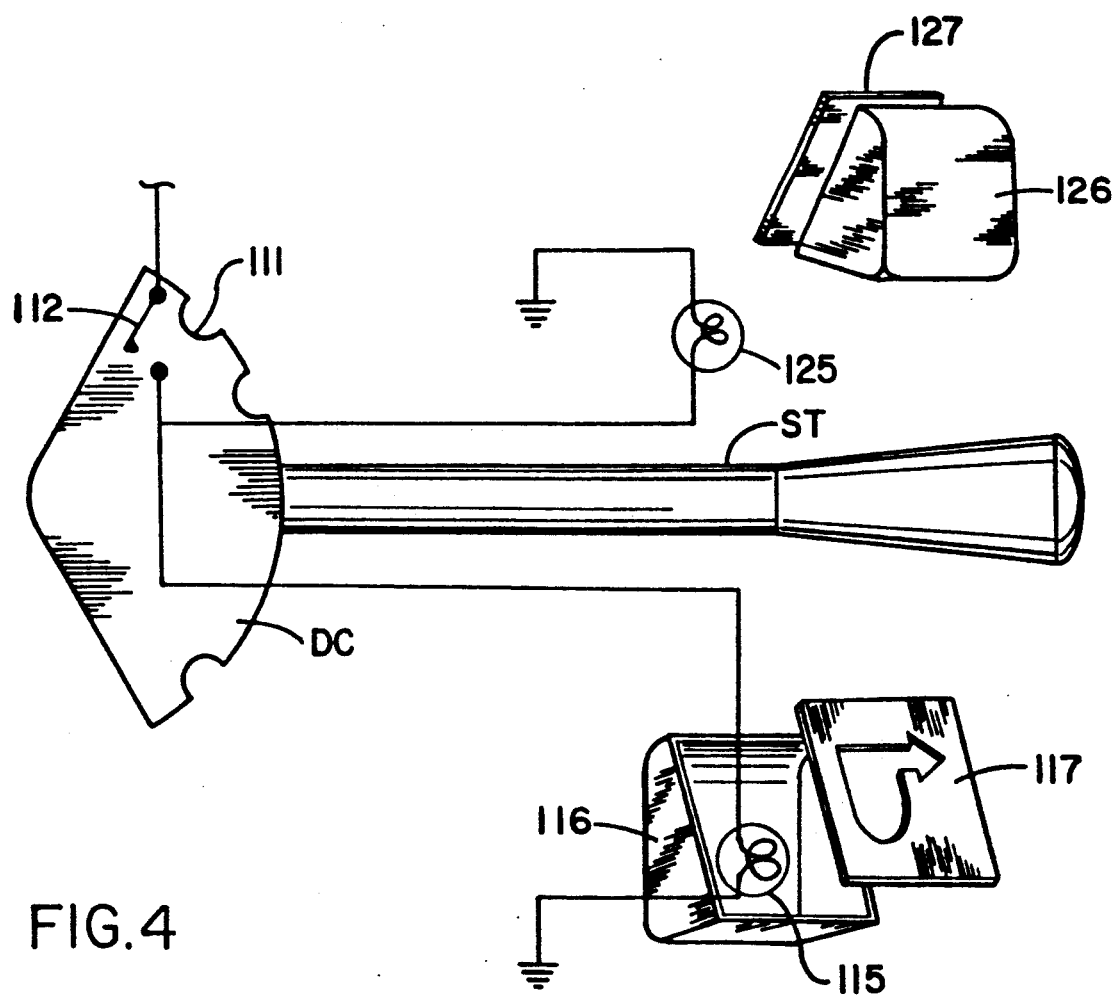
FIG. 4 is a diagrammatic illustration of yet another signaling assembly in accordance with the present invention.

As illustrated in FIG. 4, a further alternative of the present invention entails a modification of the detent cam DC of the conventional turn signal stalk ST to include one further detent 111 at the extreme position of the left hand turn. A switch 112 is then enabled at this extreme limit to turn on a front and a rear light 115 and 125 respectively at the front and rear left hand corner of the vehicle. These lights, then will illuminate, in the manner previously described, light cavities 116 and 126 each covered by a U-turn panel 117 and 127, respectively.

Since the vast majority of U-turns are in a left hand direction this added signaling arrangement will then provide the necessary visual cues for the following and oncoming traffic.

Obviously many modifications and changes may be made to the foregoing description without departing from the spirit of the invention. It is therefore intended that the scope of the invention be determined solely on the claims appended hereto.

What is claimed is:

1. In a turn signaling mechanism of a motor vehicle characterized by a steering column, a turn signal stalk extending from said column for pivotal displacement, turn switching means operatively connected to said stalk for exciting turn signal lamps in response to said pivotal displacement thereof, the improvement comprising:

a frame attachable to said stalk;

a pushrod mounted for sliding advancement along said frame, said pushrod being defined by an inner and an outer end;

a symmetrical cam surface secured to said column to oppose said inner end of said pushrod;

a lever pivotally attached to said frame and including a cam edge aligned to oppose said outer end of said pushrod;

U-turn switching means connected to said lever for providing electrical continuity therethrough in response to the pivotal displacement of said lever relative said frame; and U-turn indication means connected to said U-turn switching means to be rendered operative upon the completion of the circuit continuity in said switching means.

2. Apparatus according to claim 1 wherein: said cam edge includes a first and second detent for
receiving said outer end of said pushrod.

3. Apparatus according to claim 2 wherein:
said cam edge includes a chamfer between said first and second detents; and
said lever is universally pivoted relative said frame.

4. Apparatus according to claim 3 wherein:
said symmetrical cam surface includes a central depression for advancement of said inner end of said pushrod to withdraw said outer end from said first and second detent.

5. Apparatus according to claim 4 wherein: said pushrod is adjustable in length.

* * * * *